Jan. 6, 1970  B. J. WALLIS  3,487,718
BARREL CAM
Filed July 3, 1968
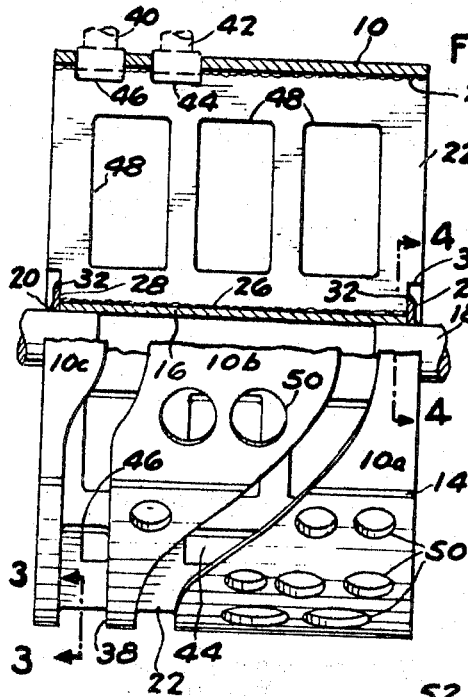
FIG. 1
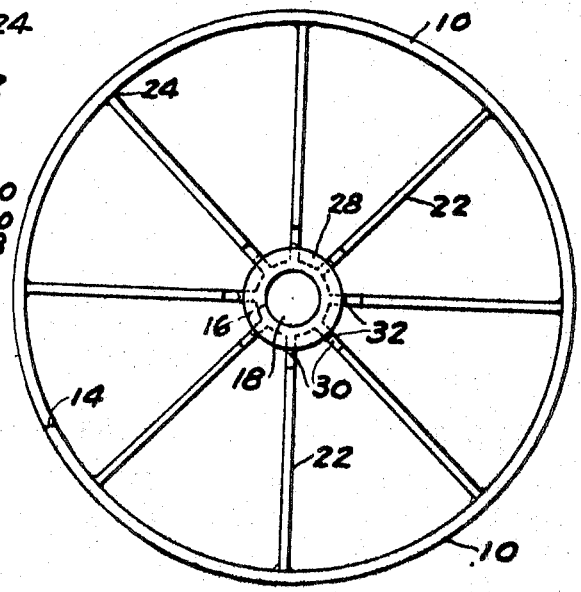
FIG. 2
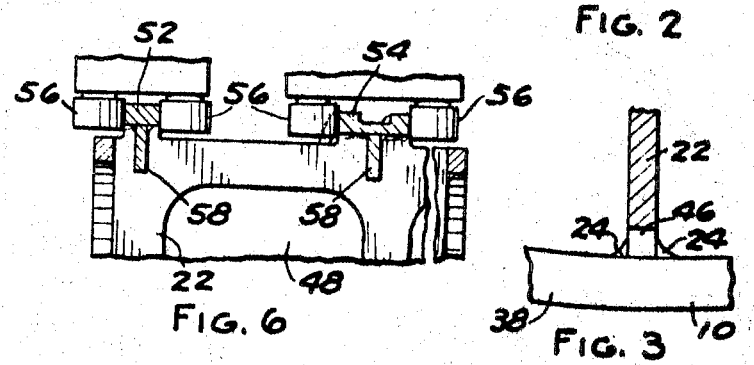
FIG. 6
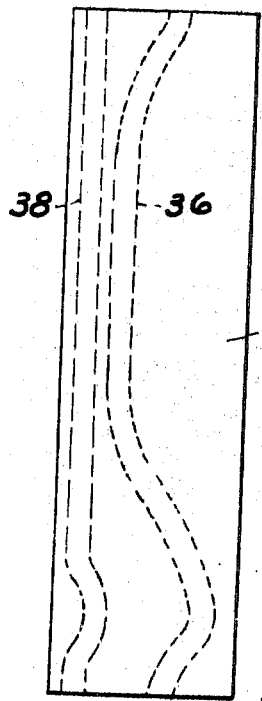
FIG. 5
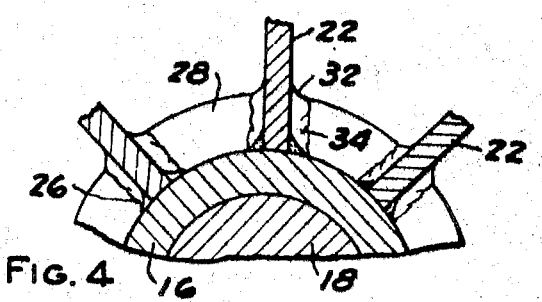
FIG. 4
FIG. 3
INVENTOR.
BERNARD J. WALLIS
BY
Barnes, Kisselle, Raisch & Choate
ATTORNEYS

United States Patent Office 3,487,718
Patented Jan. 6, 1970

3,487,718
BARREL CAM
Bernard J. Wallis, 25200 Trowbridge Ave.,
Dearborn, Mich. 48124
Filed July 3, 1968, Ser. No. 742,327
Int. Cl. F16h 53/08
U.S. Cl. 74—567                                           15 Claims

ABSTRACT OF THE DISCLOSURE

A barrel cam in the form of a cylindrical steel shell supported on a hub by a plurality of radially extending steel plates, the shell having one or more circumferentially extending slots therethrough which divide the shell into two or more axially adjacent sections which are held in fixed positions relative to one another by the radially extending steel plates.

---

This invention relates to a barrel cam.

In various types of mechanisms relatively large barrel cams (ten to twelve inches in diameter for example) are utilized for producing a particular motion of a component of the mechanism. When such barrel cams are formed from a solid bar of steel costly machining and heat-treating operations are involved. In addition, the mass of the cam is quite large and because of its inertia a considerable amount of power is required to merely start and stop rotation of the cam. In addition, with a barrel cam of this type the cam follower rollers must at all events be spaced a small clearance distance from the bottom of the cam track and it frequently happens that the wear of the cam roller results in the formation of a ridge in the cam track. When a new set of cam followers is installed in the mechanism, care must be exercised to avoid interference with the ridge produced by the previously used cam followers.

The present invention has for its object the provision of a barrel cam which avoids the difficulties mentioned above. More specifically, the barrel cam of the present invention is formed as a weldment of metal parts which includes an outer cylindrical shell, a central hub and a plurality of metal ribs extending radially between the shell and the hub. The cam track is formed as a circumferential slot extending radially through the wall of the shell so as to divide the shell into a plurality of axially adjacent sections or the shell is machined to form a circumferentially continuous cam shaped rib, the shell sections or the rib being supported by the radially extending metal ribs.

In the drawings:

FIGURE 1 is an elevational view, with parts broken away, of a barrel cam according to the present invention.

FIGURE 2 is an end view of the barrel cam.

FIGURE 3 is a sectional view along the line 3—3 in FIG. 1.

FIGURE 4 is a sectional view along the line 4—4 in FIG. 1.

FIGURE 5 is the shell of the cam laid out in the flat.

FIGURE 6 is a fragmentary view of a modified form of cam according to the invention.

Referring to FIG. 1, the barrel cam of the present invention includes a cylindrical shell 10 formed from a steel plate 12 as shown in FIG. 5. Plate 12 is rolled into a cylinder with its abutting ends beveled and welded together as at 14. The hub of the cam comprises a steel tube 16 into the opposite ends of which are arranged stub shafts 18. Shell 10 is supported on tube 16 by a plurality of rectangular steel rib plates 22 which are welded along their longitudinal edges as at 24 to the inner side of shell 10 and also as at 26 to the outer side of tube 16. The assembly is reinforced by a pair of gusset plates 28 at opposite ends of tube 16. The opposite ends of plates 22 are notched as at 30 to accommodate gusset plates 28. Gusset plates 28 are in the form of annular discs which are welded around their inner periphery to stub shafts 18 as at 20. Around their outer periphery discs 28 are welded to the notched end edges of plates 22 as at 32. At the axially inner face thereof each disc is welded to tube 16 and to the end edges of plates 22 as at 34.

In the arrangement illustrated in FIGS. 1–5 shell 10 is formed with a pair of female cam tracks 36, 38. Cam tracks 36, 38 extend circumferentially around and through shell 10 and their particular configuration will, of course, depend upon the desired motion to be imparted to the member controlled by each of these cam tracks. If desired, cam tracks 36, 38 can be laid out of the steel plate 12 while it is in the flat. After the plate is rolled into shell 10 and the various components of the barrel cam are welded together, cam tracks 36, 38 can be machined through shell 10 as a pair of slots. Since cam tracks 36, 38 extend entirely through shell 10 it divides the shell into a plurality of sections such as indicated at 10a, 10b and 10c. However, since the shell is welded to the radial rib plates 22 as at 24, the sections 10a, 10b and 10c are held rigidly in position by plates 22.

Cam tracks 36, 38 are adapted to accommodate cam follower rollers 40, 42. As is customary, the width of cam tracks 36, 38 is slightly greater than the diameter of cam follower rollers 40, 42. Plates 22 are recessed as at 44, 46 at the portions thereof aligned with the adjacent portions of cam tracks 36, 38. The recesses 44, 46 enable the cam follower rollers 40, 42 to project entirely through shell 10. With this arrangement, as the cam tracks wear over an extended period of use, the wear exhibits itself as a slight widening of the cam tracks throughout the thickness of shell 10. This is to be distinguished from an arrangement wherein a cam track is formed as a groove in a solid steel cylinder and as the cam track wears a ridge is formed in the groove adjacent the inner end of the cam follower roller.

In order to reduce the weight of the barrel cam as much as possible, steel plates 22 are formed with large openings 48 therein and the sections 10a, 10b and 10c are formed with a plurality of apertures 50. If it is desired that the cam tracks be hardened, this can be easily and economically performed by simply flame hardening the edges of the tracks.

The barrel cam shown in FIG. 6 differs from that shown in FIGS. 1–5 only in that male instead of female cam tracks are illustrated. In the arrangement shown in FIG. 6 the cam tracks are designated 52, 54. In operation each cam track is engaged on its opposite side faces by cam follower rollers 56. Cam tracks 52, 54 are initially formed as a cylindrical shell such as indicated at 10 in FIG. 1. After the shell is welded to plates 22, the shell and plates are machined away to leave only the male tracks 52, 54 as illustrated. Each cam track is reinforced by a circumferentially extending rib 56 welded around the inner periphery of the track. Rib 56 is preferably in the form of a plurality of arcuate sector plates which extend between successive radial rib plates 22 and are welded thereto at their opposite ends.

I claim:

1. A barrel cam comprising a cylindrical metal shell, means defining a hub at the axial center of the shell, at least one cam track in the form of a slot extending circumferentially around the shell and radially through the shell to divide the shell into at least two axially adjacent sections and a plurality of radially extending ribs connected at their inner ends of said hub means and at their outer ends to the shell for rigidly supporting said shell sections on said hub means.

2. A barrel cam as called for in claim 1 wherein said ribs comprise metal plates extending lengthwise of the shell.

3. A barrel cam as called for in claim 2 wherein said metal plates are provided with recesses in their outer edges at the portions thereof aligned with the adjacent portion of the cam track, said recesses having an axial dimension at least as great as the axial dimension of the adjacent portion of the cam track to enable a cam follower roller in said track to engage the full thickness of the shell.

4. A barrel cam as called for in claim 1 wherein said shell comprises a metal plate with welded abutting ends extending lengthwise of the shell.

5. A barrel cam as called for in claim 1 wherein said hub means comprises a rigid metal member which extends substantially the full length of the shell.

6. A barrel cam as called for in claim 5 wherein said hub means includes a metal tube.

7. A barrel cam as called for in claim 6 including stub shafts connected with and projecting from opposite ends of said metal tube.

8. A barrel cam as called for in claim 5 wherein said ribs comprise generally flat metal plates welded along one edge to the inner side of the cylinder and along an opposite edge to the hub means.

9. A barrel cam as called for in claim 8 wherein said metal plates extend generally the full length of the cylinder.

10. A barrel cam as called for in claim 9 including a metal gusset plate at each end of said hub extending radially beyond said hub and engaging said steel plates at their radially inner ends and welds connecting said gusset plates with said hub and with radially extending portions of said metal plates.

11. A barrel cam as called for in claim 9 wherein said metal plates and said shell are formed with a plurality of openings therein to reduce the weight of the cam.

12. A barrel cam comprising means forming a central hub, a plurality of radially extending ribs on said hub means, a cam track in the form of a rib extending circumferentially continuously around the radially outer ends of said radial ribs and secured thereto, said cam track having a throw extending axially of said hub means, said radially extending ribs having an axial extent at least as great as the throw of the cam track.

13. A barrel cam as called for in claim 12 wherein the outer edge portions of the radial ribs extending axially beyond the side faces of the cam track are recessed radially inwardly of the radially inner face of the rib forming the cam track.

14. A barrel cam as called for in claim 12 including radially reinforcing rib means secured to the radially inner face of the cam track and extending circumferentially between the successive radially extending ribs.

15. A barrel cam comprising means forming a central hub, a plurality of radially extending rib plates secured to the hub and extending lengthwise thereof, cylindrical plate means extending circumferentially around the outer ends of said rib plates, said plate means defining a cam track extending continuously around the outer ends of said rib plates, said cam track having a throw extending lengthwise of said hub means.

References Cited
UNITED STATES PATENTS

| | | | |
|---|---|---|---|
| 336,528 | 2/1886 | Puetz | 74—567 |
| 977,288 | 11/1910 | Euchenhofer | 74—567 XR |
| 1,751,938 | 3/1930 | McKean | 74—567 |
| 3,398,904 | 8/1968 | Adams et al. | 74—567 XR |

FRED C. MATTERN, JR., Primary Examiner

F. D. SHOEMAKER, Assistant Examiner